United States Patent
Lee et al.

(10) Patent No.: US 6,879,369 B2
(45) Date of Patent: Apr. 12, 2005

(54) STRUCTURE OF LCD MANUFACTURED BY ONE-DROP FILL TECHNOLOGY INCLUDING A SUBSTRATE WITH TRANSPARENT CONDUCTIVE PATTERNS

(75) Inventors: Yu-Chi Lee, Taipei (TW); Po-Hsiu Shih, Chung Ho (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 41 days.

(21) Appl. No.: 10/389,795

(22) Filed: Mar. 18, 2003

(65) Prior Publication Data

US 2004/0183992 A1 Sep. 23, 2004

(51) Int. Cl.[7] .......... G02F 1/13; G02F 1/1339; G02F 1/1341
(52) U.S. Cl. .......... 349/187; 349/153; 349/189; 349/190
(58) Field of Search .......... 349/153, 187, 349/189, 190

(56) References Cited

U.S. PATENT DOCUMENTS

| | | | | |
|---|---|---|---|---|
| 2001/0055087 A1 | * | 12/2001 | Gutfeld et al. | 349/153 |
| 2003/0043338 A1 | * | 3/2003 | Liou et al. | 349/189 |
| 2003/0147040 A1 | * | 8/2003 | Park et al. | 349/187 |
| 2004/0017526 A1 | * | 1/2004 | Kuo | 349/110 |
| 2004/0032558 A1 | * | 2/2004 | Liu et al. | 349/153 |

* cited by examiner

Primary Examiner—Tarifur R. Chowdhury
(74) Attorney, Agent, or Firm—Dickinson Wright PLLC

(57) ABSTRACT

A structure of liquid crystal display and manufacture method thereof are described. The liquid crystal display is manufactured by a one drop fill process. The display comprises a first substrate, a second substrate, a conductive pattern layer, a black matrix layer, a liquid crystal layer and an ultraviolet-type seal. The metal pattern layer is made of indium tin oxide and formed on the first substrate. Therefore, the metal pattern layer is a transparent layer allowing the ultraviolet light to pass through. The ultraviolet-type seal is pre-cured by the ultraviolet light from the first substrate direction to the seal, and then cured by a heating process. Hence, the liquid crystal pollution problem is reduced.

16 Claims, 2 Drawing Sheets

STRUCTURE OF LCD MANUFACTURED BY ONE-DROP FILL TECHNOLOGY INCLUDING A SUBSTRATE WITH TRANSPARENT CONDUCTIVE PATTERNS

FIELD OF THE INVENTION

The present invention relates to a structure of a liquid crystal display and especially to a manufacture method of the liquid crystal display.

BACKGROUND OF THE INVENTION

Recently, liquid crystal displays (LCD) have been widely applied in electrical products, due to the rapid progress of optical technology and semiconductor technology. Moreover, with the advantages of high image quality, compact size, light weight, low driving voltage, and low power consumption, LCDs have been introduced into portable computers, personal digital assistants, color televisions, and are gradually replacing the cathode ray tubes (CRT) used in conventional displays. LCDs are becoming the mainstream display apparatus.

The main part of an LCD is a liquid crystal (LC) unit composed of two parallel transparent substrates and LC sealed therein. The main LCD trend is thin film transistor (TFT) LCDs. The fabrication processes of a TFT-LCD can be divided into four parts: TFT array process, color filter (CF) process, LC cell assembly process and liquid crystal module (LCM) process.

The TFT array process is used to fabricate a TFT substrate. Each TFT respectively aligns with one pixel electrode. The CF process is used to fabricate color filter substrate. A color filter layer comprising different color filter sheets is on the color filter substrate, and a black matrix layer surrounds each color filter sheet.

The LC cell assembly process is used to parallel assemble TFT substrate and CF substrate, and bead spacers spread between them maintain a fixed distance, i.e. a cell gap, between the TFT substrate and CF substrate. LC is injected into the cell gap and then the injection opening is sealed. Basically, each pixel electrode respectively corresponds to one color filter sheet, and the black matrix layer covers TFTs and metal lines that connect different TFT.

The LCM process is used to attach a polarizer to a panel, and electrically connect a driver IC and a panel circuit. Then a reflector and a back-light are assembled on the panel. After a burn-in step, the LCM process is finished.

Generally, the direction of liquid crystal molecule axes, which are controlled by TFT, determines whether each pixel is pervious to light or not. The color of each pixel is determined by the color of color filter sheet. For example, when light passes through a red color filter sheet, a red spot is shown on the panel. Mixing red, green and blue colors can show full-color images.

Since the molecular axes of liquid crystal molecules, which are between pixel electrodes and color filter sheets, have to be controlled precisely, the color filter and the TFT substrate must be aligned precisely. The tolerable error of alignment is only within several micrometers.

Conventional LC injection is a complicated procedure in the TFT-LCD fabrication process. One drop fill (ODF) process can simplify the fabrication processes. In ODF process, an ultraviolet (UV) type seal is utilized to improve the yield rate. But a lot of LCD panels are polluted by the UV type seal in the practical fabrication process. The yield and quality of the TFT-LCD is decreased.

SUMMARY OF THE INVENTION

It is an object of the present invention to provide a method and structure to reduce the pollution of liquid crystal in a liquid crystal display manufactured by one drop fill (ODF) technology.

It is another object of the present invention is to provide a method and structure to improve an ultraviolet-type seal pre-harden condition to decrease the pollution problem.

It is further another object of the present invention is to improve the pollution problem of the liquid crystal to increase the quality and the yield of the liquid crystal displays.

To accomplish the above objectives, the present invention provides a method for fabricating liquid crystal display with one drop fill technology. The method comprises the following steps. First, a first substrate with a conductive pattern layer formed by peripheral circuits is provided. The conductive pattern layer is made of an indium tin oxide material. Second, a second substrate with a black matrix layer to avoid light leakage of the liquid crystal display is provided. Then, an ultraviolet-type seal is spread on the first substrate. A liquid crystal material is dropped on the first substrate. The first substrate and the second substrate are glued together in a vacuum chamber. The seal is exposed to an ultraviolet ray from the first substrate to pre-harden the seal for a predetermined period. Finally, the seal is heated in a heating chamber.

The first substrate is a glass substrate of a thin film transistor and the second substrate is a glass substrate of a color filter. The peripheral circuits are peripheral driving circuits located on a non-display area of the liquid crystal display.

The ultraviolet-type seal may be spread on the second substrate instead of the first substrate. The liquid crystal material may also be dropped on the second substrate instead of the first substrate.

In another aspect, the present invention provides a structure of liquid crystal display manufactured by one drop fill technology. The structure comprises a first substrate, a conductive pattern layer, a second substrate, a black matrix layer, a liquid crystal layer, and an ultraviolet-type seal. The conductive pattern layer is formed on the first substrate. The conductive pattern layer includes peripheral circuits made of an indium tin oxide (ITO) material. The black matrix layer is formed on the second substrate to avoid light leakage from the liquid crystal display. The ultraviolet-type seal glues the first substrate to the second substrate to form a chamber between the conductive pattern layer and the black matrix layer for storing the liquid crystal layer. The ultraviolet-type seal is pre-hardened by an ultraviolet ray from the first substrate through the conductive pattern layer in a predetermined period, and then the seal is heated in a heating chamber to be fully hardened.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
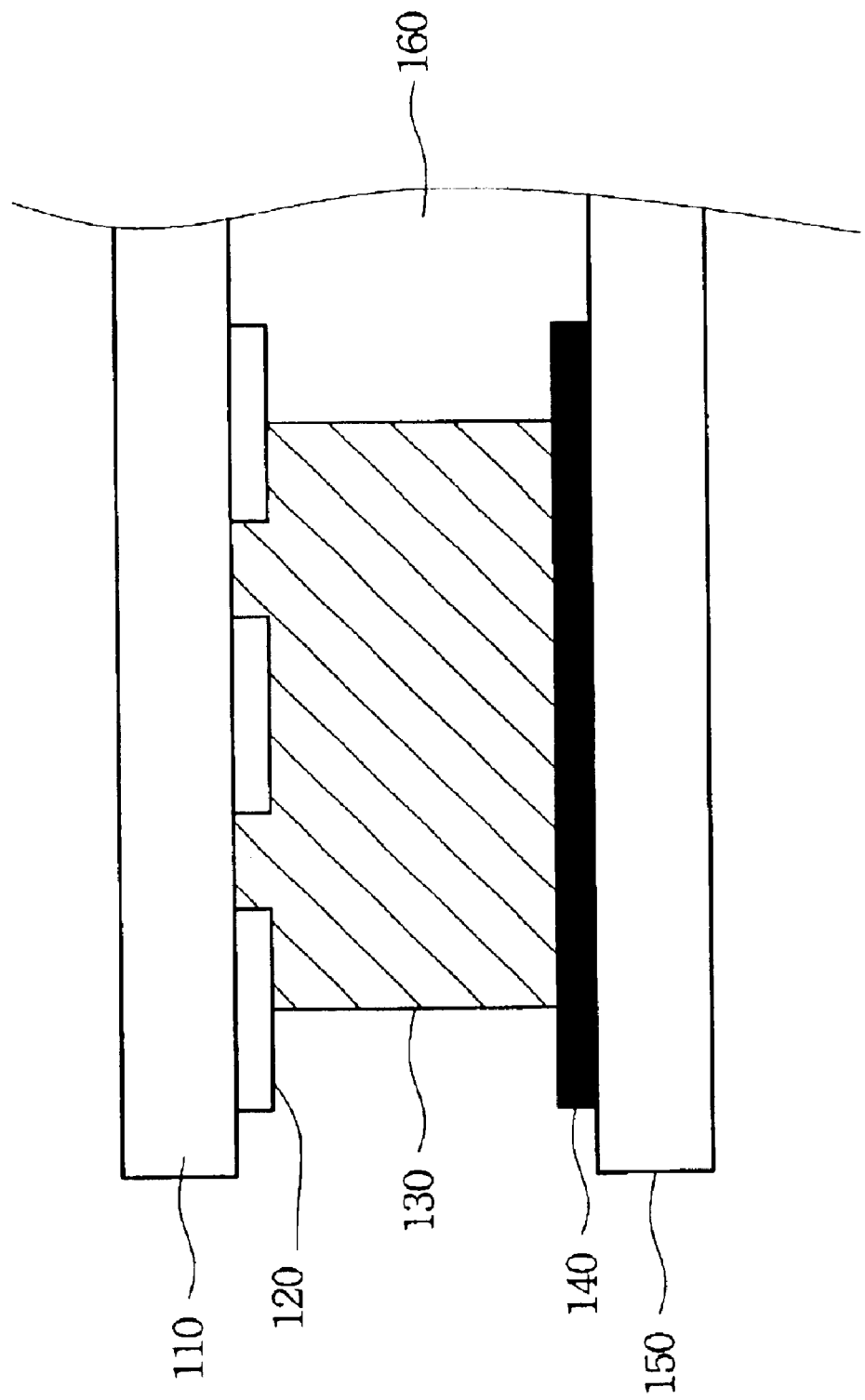
FIG. 1 is a detailed cross-sectional view of a sealed position of a TFT-LCD according to the present invention.

FIG. 1 shows a detailed cross-sectional view of a sealed position of a TFT-LCD according to the present invention. As the drawing shows, a TFT-LCD has a first substrate 110 and a second substrate 150, both of which are transparent glass material. Conventionally, the conductive pattern layer 120 is hidden behind the black matrix layer 140. The conductive pattern layer 120 includes peripheral driving circuits of the TFT-LCD. The peripheral driving circuits are formed by metal layers, made of copper, aluminun, or chromium, and positioned in a non-display area.

The TFT-LCD according to the present invention utilizes the ODF process to fill the LCD with LC. The UV type seal 130 is easily pre-hardened by a UV ray.

The conductive pattern layer 120 is formed on the first substrate 110, the substrate of the TFT, and the black matrix layer is formed on the second substrate 150, the substrate of the color filter. The seal is spread on the periphery of the substrate, and then the liquid crystal 160 is dropped on the center of the substrate by an ODF process. Finally, the two substrates are sealed with pressure force in a vacuum chamber. The seal is exposed to the UV ray for about 30 seconds to pre-harden the seal surface, and then the seal is fully hardened in a heating chamber. The liquid crystal is dropped and the seal spread on one of the substrates, the first substrate 110 or the second substrate 150 during the ODF process. The seal and the liquid crystal may be applied in any order or simultaneously. The important thing is that after the gluing step, the two substrates are transferred to the vacuum chamber and internal air is exhausted therein. The seal is then exposed to a UV ray for about 30 seconds and then heated for about 60 minutes to harden fully.

To avoid the light leakage caused by the backlight or an orientation error, the periphery of the LCD is covered with black matrix layer 140. Therefore, there is no chance to pre-harden the UV type seal with UV ray from the second substrate 150, because the black matrix layer 140 is impervious to UV rays. In particular, the width of black matrix is too thin and too narrow in TFT-LCDs which are less than 17 inches. The only way to expose the seal to the UV ray is from the first substrate 110. Conventional first substrate, that is, TFT substrate, with conductive pattern layer 220 and metal circuits made of aluminum, copper or chromium, is not fully transparent. Therefore, the conductive pattern layer forms a mesh layer.

Figure 2:
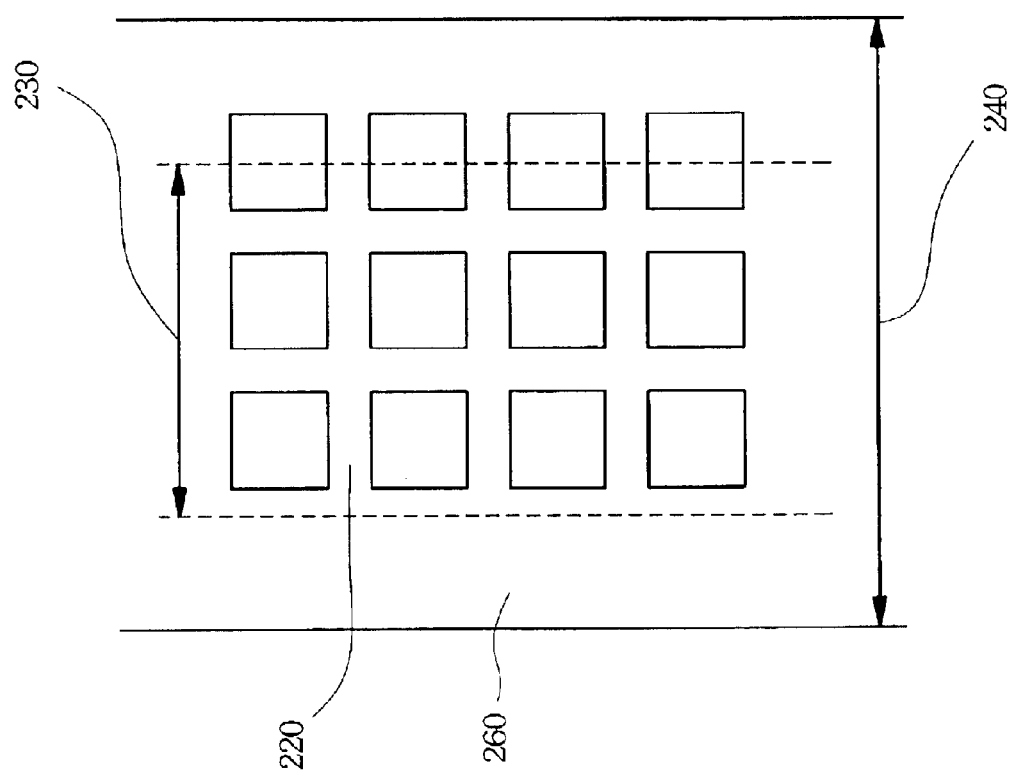
FIG. 2 is a front view of a sealed position of a TFT-LCD according to the present invention.

FIG. 2 is a front view of the sealed position of the TFT-LCD according to the present invention. The conductive pattern layer 220 is formed of transparent squares. The seal 230 is spread within this area. The black matrix layer 240 is under the seal 230 and the conductive pattern layer 220, and fully covers the seal 230. The liquid crystal 260 is positioned on the left side of the drawing.

To improve the pre-hardening step, the seal must be fully exposed to the UV ray. That is to say, the conductive pattern layer 220 has to be fully transparent. The conductive pattern layer according to the present invention is formed of a transparent material, such as an indium tin oxide (ITO) material. In the conventional art, due to the conductive pattern layer being only partly transparent, the UV ray can only partly penetrate. Therefore, the parts where the UV ray cannot reach the seal do not pre-harden. Hence, the seal surface is wet. In the vacuum chamber, the liquid crystal may contact the seal when the substrates are under pressure and the wet seal pollutes the liquid crystal.

The present invention utilizes the ITO material to form the conductive pattern layer to be a fully transparent layer. The seal can be fully pre-hardened by the UV ray. The pollution caused by the wet seal can be avoided. The LCD quality and yield increase and the defect rate decreases.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A method for fabricating liquid crystal display with one drop fill technology, the method comprising:

providing a first substrate with a conductive pattern layer formed by peripheral circuits, wherein the conductive pattern layer is made of an indium tin oxide material;

providing a second substrate with a black matrix layer to avoid light leakage of the liquid crystal display;

spreading an ultraviolet-type seal on the first substrate;

dropping a liquid crystal material on the first substrate;

gluing the first substrate and the second substrate in a vacuum chamber;

exposing the seal to an ultraviolet ray from the first substrate to pre-harden the seal for a predetermined period; and heating the seal.

2. The method of claim 1 wherein the first substrate comprises a glass substrate of a thin film transistor.

3. The method of claim 1 wherein the second substrate comprises a glass substrate of a color filter.

4. The method of claim 1 wherein the peripheral circuits comprise peripheral driving circuits located on a non-display area of the liquid crystal display.

5. The method of claim 1 wherein the vacuum chamber is utilized to exhaust air from between the first substrate and the second substrate.

6. The method of claim 1 wherein the predetermined period is about 30 seconds.

7. The method of claim 1 wherein the step of heating the seal takes about 60 minutes.

8. The method of claim 1 wherein the step of spreading an ultraviolet-type seal on the first substrate is replaced by spreading an ultraviolet-type seal on the second substrate.

9. The method of claim 1 wherein the step of dropping a liquid crystal material on the first substrate is replaced by dropping a liquid crystal material on the second substrate.

10. A structure of liquid crystal display manufactured by one drop fill technology, the structure comprising:

a first substrate;

a conductive pattern layer formed on the first substrate, wherein the conductive pattern layer is formed by peripheral circuits made of an indium tin oxide material;

a second substrate;

a black matrix layer formed on the second substrate to avoid light leakage from the liquid crystal display;

a liquid crystal layer formed by the one drop fill technology; and an ultraviolet-type seal gluing the first substrate and the second the second substrate to form a chamber between the conductive pattern layer and the black matrix layer for storing the liquid crystal layer, wherein the ultraviolet-type seal is pre-hardened by an ultraviolet ray from the first substrate through the conductive pattern layer over a predetermined period, and then the seal is heated in a heating chamber to be fully hardened.

11. The structure of claim 10 wherein the first substrate comprises a glass substrate of a thin film transistor.

12. The structure of claim 10 wherein the second substrate comprises a glass substrate of a color filter.

13. The structure of claim 10 wherein the peripheral circuits comprise peripheral driving circuits located on a non-display area of the liquid crystal display.

14. The structure of claim 10 wherein a vacuum chamber is utilized to exhaust air from between the first substrate and the second substrate after the ultraviolet-type seal glues the first substrate to the second the second substrate.

15. The structure of claim 1 wherein the predetermined period is about 30 seconds.

16. The structure of claim 1 wherein the seal is heated in a heating chamber for about 60 minutes.

* * * * *